L. C. POND.
WEEDER.
APPLICATION FILED MAY 17, 1909.
972,404.
Patented Oct. 11, 1910.
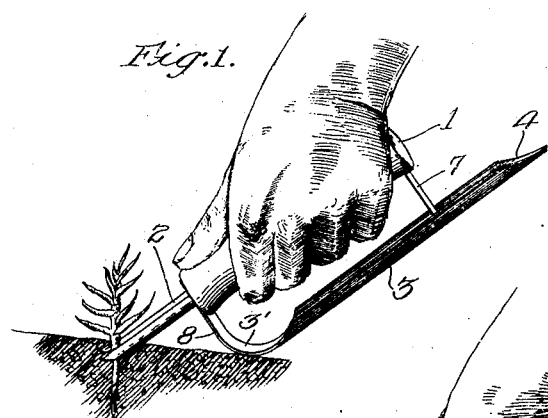
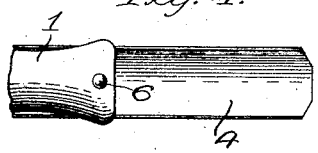
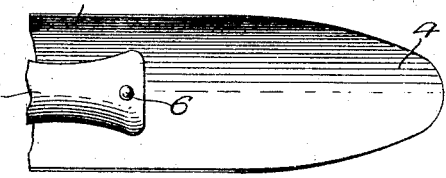
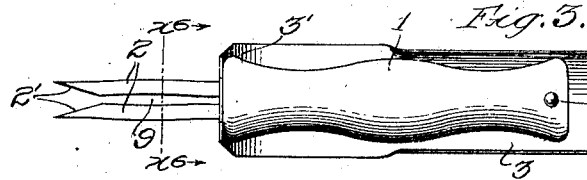
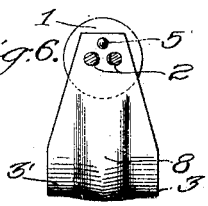
Witnesses:—
Louis W. Gratz
Geo. J. Huting.
Inventor
Linnaeus C. Pond.
by
attys
THE NORRIS PETERS CO., WASHINGTON, D. C.

UNITED STATES PATENT OFFICE.

LINNAEUS C. POND, OF LOS ANGELES, CALIFORNIA.

WEEDER.

972,404.  Specification of Letters Patent.  Patented Oct. 11, 1910.

Application filed May 17, 1909. Serial No. 496,646.

*To all whom it may concern:*

Be it known that I, LINNAEUS C. POND, a citizen of the United States, residing at Los Angeles, in the county of Los Angeles and State of California, have invented a new and useful Weeder, of which the following is a specification.

This invention relates particularly to a device for pulling or removing weeds, the device, however, being also applicable for use as a trowel.

The main object of the present invention is to provide a tool whereby weeds may be removed either by pulling or by cutting and digging out a weed, as may be found most convenient in any particular case.

A further object of the invention is to provide a guard to protect the hand from contact with the ground or with other objects in weeding.

A further object of the invention is to provide a weeder which will be adapted to efficiently grasp the stem of the weed in pulling the same.

Other objects of the invention will appear hereinafter.

The accompanying drawings illustrate the invention, and referring thereto:—

Figure 1 is a side elevation of the device, showing the position of the same in weed pulling. Fig. 2 is a similar view, showing the use of the device in digging. Fig. 3 is a plan of the device. Figs. 4 and 5 are partial plans, showing different forms of blade for use in the device. Fig. 6 is a section on line $x^6$—$x^6$ in Fig. 3 looking in the direction of the arrows. Fig. 7 is a cross sectional view through the beveled ends of the pulling prongs.

The invention comprises a handle member 1 which may be formed of wood of suitable shape to be grasped by the hand, weed pulling prongs 2 extending from one end of said handle member, and a member 3 connected to the handle member and extending parallel thereto, said member 3 constituting a fulcrum for the device when in use as a weeder, a guard for the hand, and a support for a cutting blade 4 which is formed as a continuation or extension of said member 3.

The weed extracting prongs 2 may be formed of two steel wire pieces driven or inserted into the end of the handle member 1 and extending approximately parallel to one another and having their ends beveled or outwardly and forwardly inclined, as at 2', on their inner sides to form a converging throat or passage for guiding the prongs onto and around the stem of the weed. Between these end portions and the handle member 1 the prongs 2 are bowed slightly apart, as at 9. Member 3 consists of a metal strip or plate bent in L-shape and having its shorter arm secured by nail 5 to handle member 1 at the pronged end thereof, the body of member 3 extending laterally from the front end of handle 1 and then rearwardly, approximately parallel to the handle member and connected by a cross piece or rivet 6 to the other end of said handle member, said rivet extending perpendicular to the handle member 1 and a spacing sleeve 7 being provided around said rivet to hold the members apart. The bend 3' of the L-shaped member 3 is preferably rounded so as to form a rolling surface for use in weeding, and this portion is creased as at 8 to stiffen the device. From this portion the member 3 extends rearwardly in the form of a channel or trough shaped plate segmental in cross section and having its concaved side presented toward the handle member. The portion 4 of said plate which extends beyond the cross piece 6 serves as a trowel or blade for uses in digging and being preferably sharpened at its end and otherwise suitably formed for this purpose. Figs. 3, 4 and 5 show different forms of this blade suitable for different purposes. The form shown in Fig. 4 is adapted more particularly for use as a trowel, that of Fig. 5 being particularly adapted for weed cutting, and that of Fig. 3 being an intermediate form adapted for both uses.

In using the device as a weeder it is grasped as shown in Fig. 1 and the prongs 2 are caused to embrace the weed stem, the inclined portions or bevels 2' on the ends of the prongs guiding them onto the stem when the device is shoved longitudinally to bring the fulcrum portion 3' in contact with the ground. On then rocking the handle downwardly on this fulcrum the weed is pulled in obvious manner. If desired, the prongs may be shoved far enough over the stems to bring the stems into the widened or bowed portion between the prongs, and in that case the elasticity of the prongs will aid in grasping the stem. This bowed portion of the prongs also permits larger weeds to be brought closer to the fulcrum so that more lifting force can be exerted thereon.

The bowed portion makes the device self-clearing as it permits the earth to drop through and prevents earth from gradually working back and packing between the prongs. In case it is desired to cut and dig the weed instead of pulling it, the device will be used as shown in Fig. 2, the handle being grasped so as to present the cutting blade 4 toward the plant and the blade being thrust into the ground in obvious manner to perform the desired function. In this position the device is susceptible of various other uses, as in troweling, etc. The member 3 extending approximately parallel to the handle means serves also as a guard preventing contact of the back of the hand with the ground or with weeds, etc., thus adding materially to comfort and cleanliness in using the device.

What I claim is:—

1. A weeder comprising a handle member, weed pulling prongs at one end of the handle member having rounded inner faces and forked end portions, the prongs being bowed apart back of their forked portions.

2. A weeder comprising a handle, a pair of weed pulling prongs at the forward end of said handle, and a member secured to the handle at each end of the handle and having a rounded portion at the end nearest the prongs to serve as a fulcrum, said member also serving as a guard for the handle.

3. A weeder comprising a handle, a pair of prongs extending from one end of the handle, and a member extending laterally from said end of the handle and bent to form a fulcrum and extending rearwardly beyond the handle to form a cutting blade.

4. A weeder comprising a handle, a pair of prongs extending from one end of the handle, and a member extending laterally from said end of the handle and bent to form a fulcrum and extending rearwardly beyond the handle to form a cutting blade, the cutting blade portion being concaved toward the handle.

5. A weeder comprising a handle, a pair of prongs extending from one end thereof, said prongs having their ends beveled on the inner side forming flat faces converging upwardly and being bowed apart between said beveled portions and the handle, and fulcrum means for said handle.

In testimony whereof, I have hereunto set my hand at Los Angeles, California, this 11th day of May 1908.

LINNAEUS C. POND.

In presence of—
G. T. HACKLEY,
FRANK L. A. GRAHAM.